US 8,959,618 B2

(12) United States Patent
Schneider (10) Patent No.: US 8,959,618 B2
(45) Date of Patent: Feb. 17, 2015

(54) MANAGING PASSWORD EXPIRY

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1361 days.

(21) Appl. No.: 12/025,954

(22) Filed: Feb. 5, 2008

(65) Prior Publication Data

US 2009/0199294 A1 Aug. 6, 2009

(51) Int. Cl.
*G06F 7/04* (2006.01)
*G06F 21/57* (2013.01)
*G06F 21/31* (2013.01)
*G06F 21/33* (2013.01)

(52) U.S. Cl.
CPC ............. *G06F 21/577* (2013.01); *G06F 21/31* (2013.01); *G06F 21/33* (2013.01); *G06F 21/316* (2013.01)
USPC ............................................. 726/18; 713/156

(58) Field of Classification Search
CPC ....... G06F 21/30; G06F 21/50; G06F 21/316; G06F 21/577; H04L 63/083; H04L 9/0863; H04L 63/10; H04L 63/102; H04L 63/107; H04L 63/108
USPC ................. 726/2, 5–7, 17–20, 26, 27, 22–25; 713/182
See application file for complete search history.

(56) References Cited

U.S. PATENT DOCUMENTS

| | | | |
|---|---|---|---|
| 6,341,352 B1* | 1/2002 | Child et al. ...................... 726/1 |
| 7,200,754 B2* | 4/2007 | Walters ........................ 713/182 |
| 7,941,831 B2* | 5/2011 | Mandhana et al. ............... 726/5 |
| 8,369,521 B2* | 2/2013 | Ward ............................. 380/44 |
| 8,463,819 B2* | 6/2013 | Shashikumar et al. ........ 707/796 |
| 2002/0124191 A1* | 9/2002 | Molin .......................... 713/202 |
| 2002/0147914 A1* | 10/2002 | Arnold ......................... 713/186 |
| 2002/0184217 A1* | 12/2002 | Bisbee et al. ..................... 707/9 |
| 2003/0018919 A1* | 1/2003 | Arbab et al. .................. 713/202 |
| 2004/0003294 A1* | 1/2004 | Moore ......................... 713/202 |
| 2004/0088355 A1* | 5/2004 | Hagan et al. ................. 709/203 |
| 2004/0177272 A1* | 9/2004 | Walters ........................ 713/201 |
| 2005/0027713 A1* | 2/2005 | Cameron et al. ............. 707/100 |
| 2005/0086298 A1* | 4/2005 | Campbell et al. ............ 709/203 |
| 2005/0125699 A1* | 6/2005 | Harper ......................... 713/202 |
| 2005/0216955 A1* | 9/2005 | Wilkins et al. .................. 726/23 |
| 2006/0041756 A1* | 2/2006 | Ashok et al. .................. 713/183 |
| 2006/0200681 A1* | 9/2006 | Kato et al. .................... 713/193 |
| 2007/0204033 A1* | 8/2007 | Bookbinder et al. ......... 709/224 |
| 2008/0114986 A1* | 5/2008 | Morris et al. ................. 713/183 |
| 2008/0189380 A1* | 8/2008 | Bosworth et al. ............ 709/207 |
| 2008/0209221 A1* | 8/2008 | Vennelakanti et al. ....... 713/183 |
| 2009/0126018 A1* | 5/2009 | Keohane et al. ................ 726/23 |

* cited by examiner

*Primary Examiner* — Nirav B Patel
(74) *Attorney, Agent, or Firm* — Lowenstein Sandler LLP (57) ABSTRACT

A method and apparatus for managing the expiration of a password. In one embodiment, the method comprises determining whether a behavior anomaly associated with an account has occurred. In response to a determination that the behavior anomaly has occurred, the method expires a password associated with the account and forces the password be changed the next time the password is presented for accessing the account.

17 Claims, 5 Drawing Sheets

OPERATIONS PERFORMED BY THE MONITORING DAEMON

FIG. 5

MANAGING PASSWORD EXPIRY

TECHNICAL FIELD

Embodiments of the present invention relate to computer security, and more specifically, to the management of passwords.

BACKGROUND

Many computing systems are configured to expire passwords on a regular basis. One reason for expiring a password is to improve security of the computing systems. The longer a password remains the same, the greater the risk that the password could be stolen by a malicious intruder. By regularly changing a password, the probability of someone stealing a password is greatly reduced.

In most conventional systems, passwords expire at a fixed time interval. The period at which a password expires is based on an estimate of how long it would take for an intruder to guess the password by brute force. This "estimate" was based on the computing speed of decades ago, and has no relevance to modern computing technologies. Thus, the length of expiration periods become arbitrary in most systems and can no longer be justified. Some other conventional systems expire a password when a predetermined number of logins has occurred, or when a predetermined number of days has passed since the last login. These predetermined numbers, in most systems, are also arbitrarily set and cannot be justified.

Therefore, there is a need to change the current policy for expiring passwords, such that computer security can be improved.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for managing password expiry. In one embodiment, a password of a user account is expired when a behavior anomaly associated with the account is detected. The behavior anomaly indicates that the password of the user's account may have been compromised, or that the password has been used in a manner that makes it easier or more likely to be compromised. The behavior anomaly can be defined by a combination of one or more specific acts or triggers. Definitions of a behavior anomaly can be flexibly modified to meet the needs of each individual user and the system environments. When a behavior anomaly is detected and the password of a user's account is expired, the user will be forced to change his password at the time of the next login. Thus, the integrity of the system can be protected against malicious intruders.

The behaviors of a user can be modeled based upon the statistics of all of the users in general, or based upon the historical behavior pattern of that user. A behavior model of a user includes a collection of behavior cues, many of which indicate a deviation from a behavior norm. These behavior cues can be used, separately or in combination, to define a behavior anomaly. For example, a request for checking a user's email that comes from an unauthorized system (e.g., a system not registered as belonging to that user) may be one of the behavior cues that, by itself or in combination with others, indicates a deviation from the norm. As the unauthorized system may be a remote terminal in a public location (e.g., an Internet cafe), it is likely that an intruder may use a keylogger installed on that terminal to steal the password. Other behavior cues that indicate a deviation may include, but are not limited to, an attempt to use a password to gain unauthorized access to other systems or files, the use of a password to log into an account at an atypical time, logins from an IP address not recognized by the system, and multiple unsuccessful login attempts followed by a successful login in a given time period.

Thus, the technique described herein expires a password when a security breach has likely occurred or is likely to occur. Unlike the conventional technique that expires a password based on an arbitrary time period, the technique described herein expires a password when there is a reason to suspect a security breach. With the technique described herein, people are able to do their work in a flexible manner, and, at the same time, are protected against disclosing their passwords to intruders.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "determining", "receiving", "detecting", "expiring", "monitoring", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
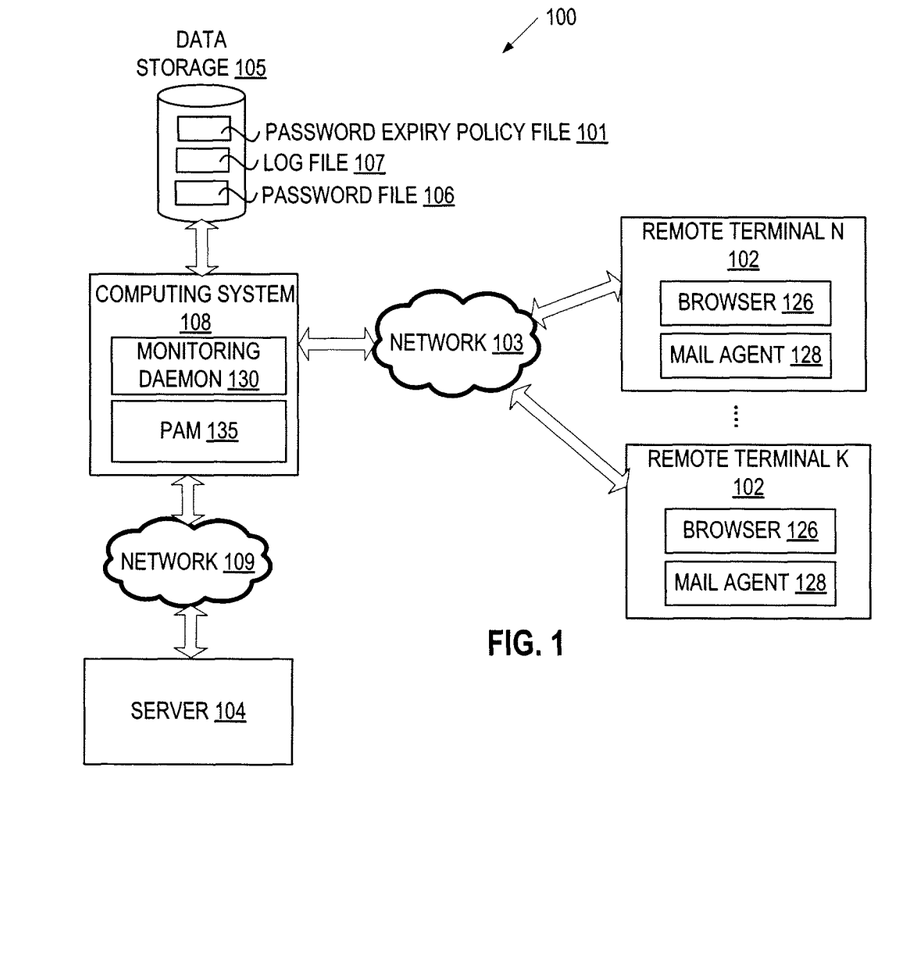
FIG. 1 illustrates a network architecture in which embodiments of the present invention may be implemented.

FIG. 1 illustrates an exemplary network architecture 100 in which embodiments of the present invention may operate. The network architecture 100 includes one or more remote terminals 102, a computing system 108, a server 104, and networks 103 and 109. The remote terminals 102 may be, for example, personal computers (PCs), mobile phones, palm-sized computing devices, personal digital assistants (PDAs), and the like. Each remote terminal 102 may install application software for accessing data from hosts (e.g., a server 104) via networks 103 and 109. The application software may include, but is not limited to, one or more of a web browser 126 and a mail agent 128 (e.g., a mail reading software, such as Microsoft Office Outlook or Mozilla Thunderbird).

The server 104 provides data resources for the remote terminals 102. In one embodiment, the server 104 may be a web server that hosts a web site, a mail server that holds and distributes email, a file server, or a server that hosts other data resources. The server 104 may contain a server front end responsible for network communications, plugins for server functions (such as web or mail administration), a basic directory tree containing server-related data, and a database back end plugin responsible for managing the storage and retrieval of data.

In one scenario, the remote terminals 102 do not have direct access to the resources on the server 104. Rather, the remote terminals 102 access the resources on the server 104 via the computing system 108. The computing system 108 may be a computer, a server, or any other computing devices. In this scenario, the computing system 108 acts as a proxy for the server 104 and performs user authentication for the server 104. To authenticate a user, in one embodiment, the computing system 108 runs a monitoring daemon 130 and a pluggable authentication module (PAM) 135. The monitoring daemon 130 runs in the background to monitor activities and collect behavior statistics relating to each of the accounts managed by the computing system 108. The PAM 135 includes a collection of code libraries, with functions that can be called by the computing system 108. The PAM 135 authenticates users to see if they are who they say they are, and determines whether a user has permission to engage in an activity. Further, the PAM 135 manages, updates, and expires passwords. In one embodiment, the PAM 135 can be implemented to include the functionality of monitoring daemon 130. Thus, the computing system 108 may include only the PAM 130 to perform both behavior collection and password management. The PAM 130 may be implemented on top of the Linux® operating system or other operating systems.

In the embodiment shown in FIG. 1, the computing system 108 stores and manages a password file 106, a log file 107 and a password expiry policy file 101 in data storage 105. The data storage 105 may comprise mass storage devices, such as magnetic or optical storage based disks or tapes. One or more of the password file 106, the log file 107 and the password expiry policy file 101 may also be stored in internal memory or caches of computing system 108. In one embodiment, the password file 106 contains passwords and user names for the accounts managed by the computing system 108. The log file 107 contains a history of activities and events associated with the accounts, and the password expiry policy file 101 contains one or more policies for expiring the passwords. The use of the password file 106, the log file 107 and the password expiry policy file 101 for expiring passwords will be described in greater detail with reference to FIGS. 2-4.

It is understood that, in an alternative scenario, the remote terminals 102 may have direct access to the server 104 without going through the computing system 108. In this alternative scenario, the server 104 would perform the authentication and authorization functions by running the monitoring daemon 130 and the PAM 135. The server 104 would also have access to the password file 106, the log file 107 and the password expiry policy file 101.

The remote terminals 102 are coupled to the computing system 108 and server 104 via the networks 103 and 109, which may be public networks (e.g., Internet) or private networks (e.g., Ethernet, Local Area Networks (LANs), or corporate intranets), or a combination of both. Networks 103 and 109 may be part of the same network system or belong to different network systems.

Figure 2:
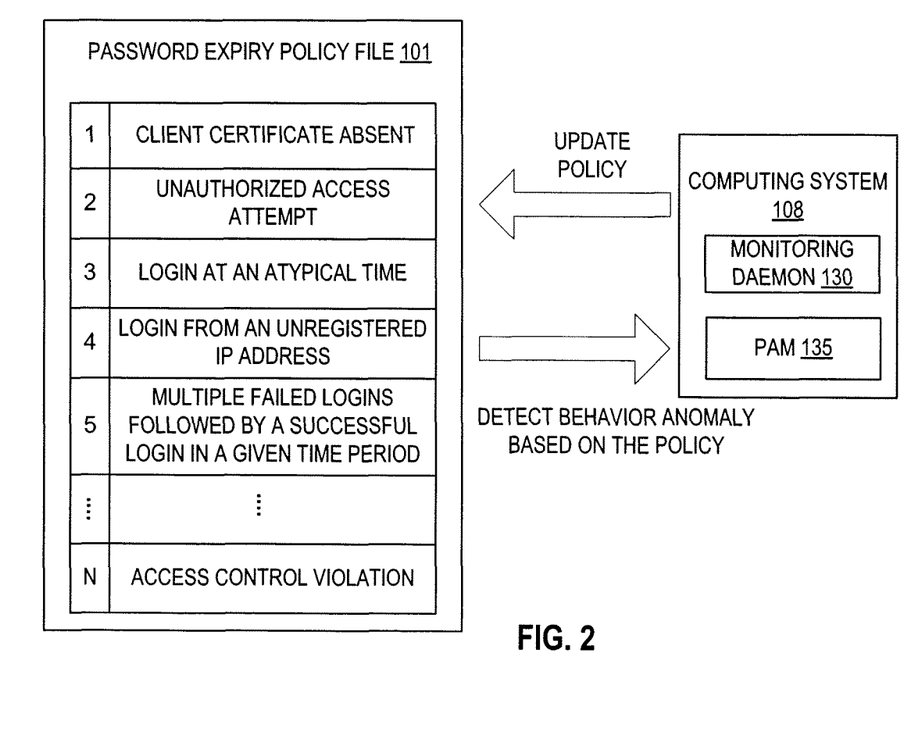
FIG. 2 illustrates an example of a password expiry policy.

FIG. 2 illustrate an example of the password expiry policy file 101. The password expiry policy file 101 includes a list of behavior cues that indicate a password has been or is like to be compromised. One or more of the behavior cues can be combined to define a behavior anomaly for a user. For example, a behavior anomaly for a user may be defined as "client certificate absent." That is, a behavior anomaly may be deemed to occur when it is detected that the client certificate is absent. More about the client certificate will be described in detail later. Another behavior anomaly may be defined as a combination of multiple behavior cues, such as a combination of a threshold number of behavior cues. For example, a behavior anomaly may be deemed to occur when at least a threshold number (e.g., three or more) of the following behavior cues are detected: "more than five unsuccessful login attempts, followed by a successful login attempt, within a five minute time frame", "unsuccessful and successful login attempts all originated from the same system, OR no two attempts came from the same system", "successful login attempt came from a system not previously associated with the user or an unrecognized system", and "successful login attempt occurred between 10 P.M. And 6 A.M."

Different users may have the same or different policies for expiring their passwords. Further, the list of behavior cues can be updated to reflect a behavior change. For example, if a user travels to a different time zone and expects to login at odd hours, the user can request the computing system 108 or an administrator of the computing system 108 to update the policy, or to temporarily disable a particular policy item. If the user forgets to request a policy update and logs into the account at 3 A.M., for example, he can still access his account but will have to change his password next time when he logs in. If an intruder steals the password and logs in at 3 A.M., the computing system 108 flags the login event as an exception, and requires the next person that logs into the account to change the password. If the legitimate user is the next person that logs into the account, the stolen password will be changed and will no longer be valid. If the intruder is the next person that logs into the account and is prompted for a password change, the intruder may break the connection (thus allowing the password to be changed later by the legitimate user), or change the password. If the password is changed by the intruder, the legitimate user can call the help desk to reset the password when he fails to log in with the old password. As a result, the intruder's password will no longer be valid. Thus, the user is afforded flexibility in account access and, at the same time, protected against the use of a compromised password.

In FIG. 2, the password expiry policy file 101 includes "client certificate absence" as a behavior cue (item #1 on the list). A client certificate is used on a secure connection, such as a connection to a secure website or a company mail server. A client certificate accompanies a login request to identify the source of the login request. A client certificate may be provided, for example, by the technical support staff of a company that issues a client certificate for every company-owned computer. Thus, a login request without the accompanying client certificate is an indication that the request originates from a non-company-owned computer, and that the user may have typed in his user name and password from a non-secure terminal (e.g., where a keylogger is installed to steal the user's credentials). For this reason, a company may use "client certificate absence" as a password expiry policy to expire passwords for all its employees, thus ensuring the security of the company's proprietary information.

A client certificate is used to establish a secured connection. For example, a user may wish to check his work email from outside his office. Allowing the user to check his work email from outside his office provides flexibility to the user's work environment and improves the user's mobility. However, checking email from a public location (e.g., an Internet cafe) may expose the user's password to a malicious intruder, who may see the password being typed in, or may use a keylogger to steal the password. That is, the user's behavior of accessing email from a public location may have compromised, be likely to compromise, or make it easier to compromise his password. The existence of a client certificate is one of the password expiry policies that will allow flexibility and prevent the password from being compromised. This policy allows a user to login and work one time from an unauthorized system using a valid password, but forces the user to change his password the next time the password is presented for login to that account.

To continue with the above example, the computing system 108 may be configured to handle the situation when the user attempts to log in again from an unauthorized system the next time. In one scenario, an expiry state may be created to allow password changes only from known (i.e., authorized) systems. In that case, when a user logs into a system using an expired password, the user may see this message on the screen: "Your password has expired, please log in from an authorized system to change it." In an alternative scenario when the user logs in again from an unauthorized system, a login process will require that the user change his password before succeeding in login. After the user logs in, a post-login process recognizes that the login came from an unauthorized system, and immediately expires the password again. This would have the effect of requiring the user to come up with a new password every time he logs in, until he stops using the unauthorized system.

Two examples are provided below to illustrate how a client certificate is used to establish a secure connection. In these two examples, it is assumed that "client certificate absent" is a policy for expiring a user's password. In one example, a company's mail server (e.g., server 104 of FIG. 1) uses a mail Post Office Protocol (POP) with Secure Socket Layer (SSL) or Transport Layer Security (TLS). When a user at the remote terminal 102 checks his email, the mail agent 128 (e.g., a mail reading software, such as Microsoft Office Outlook or Mozilla Thunderbird) connects to the server 104 and sends a "client hello" (a login request) to start a secure connection (e.g., a SSL connection) to the server 104. The server 104 sends back its server certificate, including its identifying information, such as public key and administrative information, signed by a certifying authority. The server 104 also asks the remote terminal 102 (i.e., the source of the login request) for a client certificate. However, the server 104 will establish a secure connection even though no client certificate is sent back to the server 104. If the mail agent 128 on the remote terminal 102 has a client certificate, the mail agent will send it back to the server 104. The mail agent 128 may ask the user where to find the client certificate, locates the client certificate and sends it back to the server 104. If the mail agent 128 on the remote terminal 102 is not configured to have a client certificate, the mail agent 128 can ignore the request. The server 104 and its proxy (the computing system 108) will notice the absence of the client certificate, which is an indication that the login request is sent from a terminal likely to be non-secure. At this point, regardless of the existence of the client certificate, the server 104 establishes a secure connection to the remote terminal 102, and the application layer of the mail protocol (POP) is in force. If the client certificate is absent, the computing system 108 will flag the absence as an exception. The current login session, in which the user is in the process of checking his email, will not be affected by the absence of the client certificate. At this point, the mail agent 128 sends the user name, waits for a request for password, and then sends the password to complete the login operations. If the client certificate is absent in the current login session (which is indicated by the flagged exception), the password used for the login will be expired. The user will be asked to change his password the next time the password is presented for login to his account. In one scenario, the mail agent 128 and/or mail server 104 may not have the interface to support password changes. In this scenario, an expired password will be interpreted as "authentication failed." The user may have to change his password from a different host, e.g., a web server, that offers the interface to support password changes.

As another example, when a user goes to a secure website hosted by a web server (e.g., the server 104 of FIG. 1), the browser 126 on the user's remote terminal 102 connects to the server 104 and requests a secure connection. The server 104 sends a server certificate and requests, without requiring, a client certificate to be sent back. That is, if the browser 126 on the remote terminal 102 is configured to have a client certificate, the client certificate will be sent to the server 104. If the remote terminal 102 does not have the client certificate, the server 104 will notice the absence of the client certificate. The computing system 108, which acts as a proxy of server 104, will also notice the absence of the client certificate, and will flag the absence as an exception. Similar to the mail access example mentioned above, the current login session, in which the user is in the process of starting the browser 126, is not affected by the absence of the client certificate. At that point, the browser 126 sends the user name and the password to complete the login operations for accessing the secure website. If the client certificate is absent in the current login session (which is indicated by the flagged exception), the password used for the login will be expired. The user will be asked to change his password the next time the password is presented for login to his account.

Figure 3:
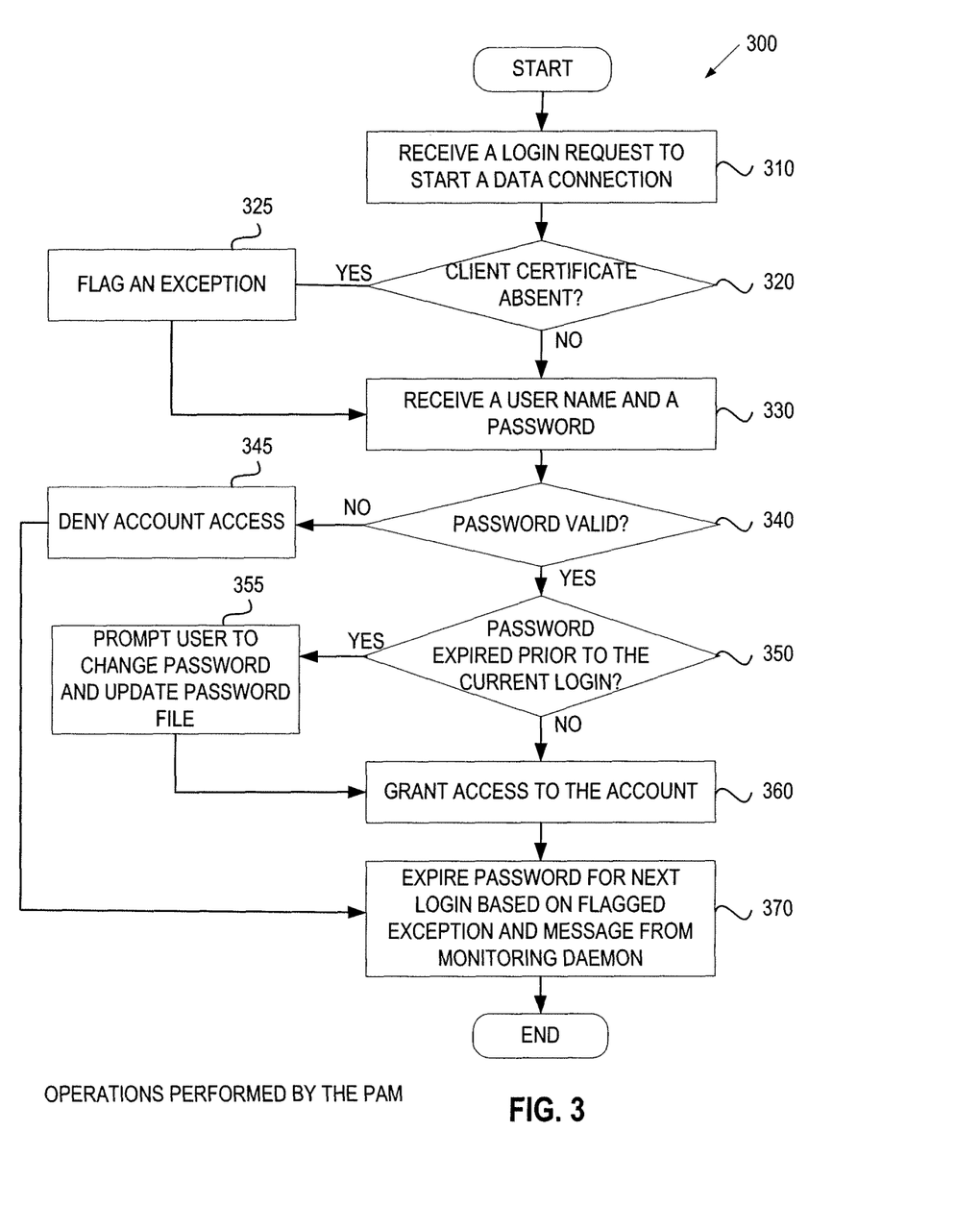
FIG. 3 illustrates a flow diagram of one embodiment of a process performed by a pluggable authentication module (PAM) to manage passwords.

FIG. 3 illustrates a flow diagram of one embodiment of a process 300 for expiring a password. The process 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the process 300 is performed by the computing system 108 of FIG. 1, executing the PAM 135 for establishing a data connection between one of the remote terminals 102 and the server 104.

Referring to FIG. 3, at block 310, the process 300 begins with the computing system 108 receiving a login request from one of the remote terminals 102 to start a data connection with the server 104. If a secure connection is requested, the server 104 sends a server certificate and requests, without requiring, a client certificate in return. If, at block 320, the computing system 108 determines that the client certificate is absent and if the absence is defined in the password expiry policy file 101 as a behavior anomaly for the account, the PAM 135 flags an exception at block 325. The process 300 then continues to block 330 to receive a user name and a password. If, at block 310, a standard connection is requested, the operations of blocks 320 and 325 may be omitted.

Proceeding to block 330, the computing system 108 receives a user name and a password from the remote terminal 102. At block 340, the PAM 135 of the computing system 108 compares the received password with the password stored in the password file 106 (of FIG. 1) to determine whether the password is valid. If the password is not valid, at block 345, the PAM 135 denies account access and proceeds to block 370. If the password is valid, at block 350, the PAM 135 determines from the password file 106 whether the password has been marked as expired prior to the current login request. If the password has expired, at block 355, the PAM 135 prompts the user to change his password and updates the password file 106 to reflect the change. The process 300 then proceeds to block 360 to grant access to the account associated with the password. If the password has not expired, at block 360, access to the account is granted. At block 370, the PAM 135 expires the current password if there is a flagged exception or a message from the monitoring daemon indicating the occurrence of a behavior anomaly, as defined by the password expiry policy file 101 for this account. If the PAM 135 expires the current password, a user of the account will be prompted to change his password the next time his password is presented for login to his account. The process 300 then terminates until a next login request is received.

Although not shown in FIG. 3, the PAM 135 may also expire a password before a login request is received. That is, a password may be expired asynchronously with the login request processing shown in FIG. 3. For example, the monitoring daemon 130 may scan the log file 107 and determines that a behavior anomaly has occurred in the recent past. Thus, the monitoring daemon 130 will notify the PAM 135 to expire the password associated with the account in question. A user of the account will be prompted to change his password next time his password is presented for login.

Figure 4:
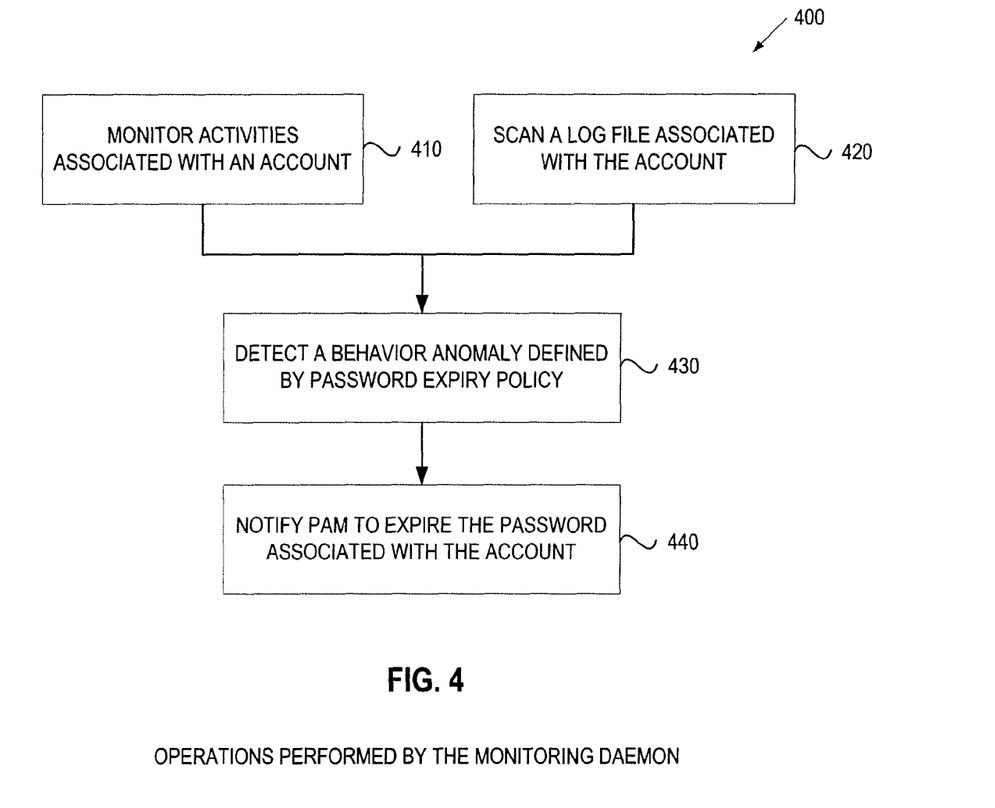
FIG. 4 illustrates a flow diagram of one embodiment of a process performed by a monitoring daemon to monitor account access behaviors.

FIG. 4 illustrates a flow diagram of one embodiment of a process 400 for monitoring account activities in the background to determine the occurrence of a behavior anomaly. The process 400 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the process 400 is performed by the computing system 108 of FIG. 1 executing the monitoring daemon 130.

Referring to FIG. 4, at block 410, the process 400 begins with the monitoring daemon 130 monitoring and collecting the activities and events relating to account access; in particular, activities and events that indicate a password has been compromised or is likely to be compromised. At block 420, the monitoring daemon 130 may also scan the log file 107 to determine whether, in the recent past, any activity and event has occurred that indicates a password has been compromised or is likely to be compromised. Operations of block 410 and block 420 may be performed asynchronously. At any point during the operations of blocks 410 and 420, when a behavior anomaly is detected according to the password expiry policy file 101 for the account (block 430), the monitoring daemon 130 notifies the PAM 135 of the anomaly such that the password associated with the account can be expired (block 440). The monitoring daemon 130 continues to run in the background to ensure that all behavior anomalies defined by the password expiry policy file 101 are captured.

Figure 5:
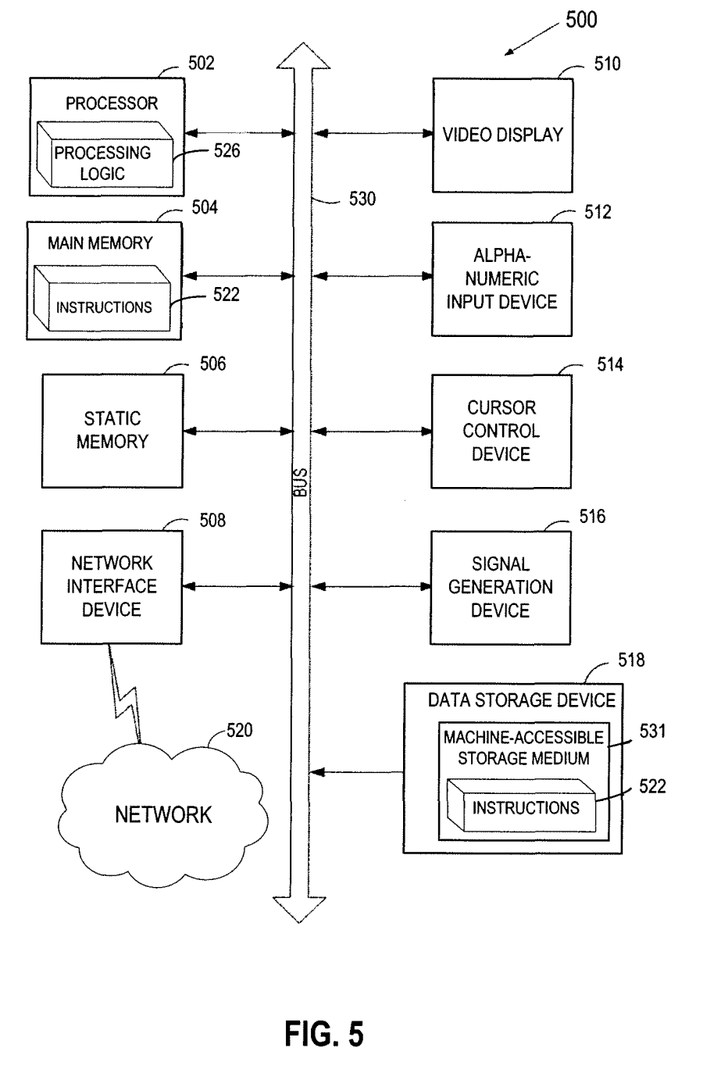
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM)

such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the monitoring daemon 130 and the PAM 135 of FIG. 1, and/or the password expiry policy file 101, the log file 107 and the password file 106. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for managing the expiration of a password have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
receiving one or more attempts to log in from a client device into an account;
monitoring, by a processing device, activities associated with the account in view of a password expiry policy that comprises a plurality of behavior deviations that deviate from a behavior norm associated with the account, wherein the plurality of behavior deviations comprise an attempt to log in from the client device that does not have a client certificate to secure a connection from the client device to the processing device;
in response to determining that a number of occurrences of the plurality of behavior deviations exceeds a determined threshold, expiring a stored password associated with the account;
receiving a next login request to the account from the client device, the login request comprising an input password;
determining whether the client device has the client certificate;
in response to determining that the client device does not have the client certificate, tagging the login request with a flag;
validating the input password with the stored password associated with the account;
in response to determining that the input password matches the stored password,
determining whether the stored password is an expired password;
in response to determining that the stored password is expired, causing replacing the expired stored password with a new password so that the new password becomes the stored password associated with the account;
granting access to the account; and
in response to identifying the flag being associated with the login request, expiring the stored password subsequent to granting the access to the account;
each time receiving a subsequent attempt to log in from the client device that does not have the client certificate, the method further comprising:
validating a new input password;
expiring the stored password of the account subsequent to successfully validating the new input password with the stored password associated with the account; and
causing replacing the expired stored password with another new password so that the other new password becomes the stored password associated with the account.

2. The method of claim 1, further comprising:
receiving a login request that specifies the input password of the account associated; and
detecting the plurality of behavior deviations in view of historical behaviors associated with the account.

3. The method of claim 1, wherein the plurality of behavior deviations comprise a behavior deviation associated with a login request.

4. The method of claim 1, wherein the plurality of behavior deviations comprise an attempt to gain unauthorized access using the input password.

5. The method of claim 1, wherein the plurality of behavior deviations comprise a request sent from an unauthorized system.

6. The method of claim 2, wherein the detecting is in view of the historical behavior of a set of users.

7. A system comprising:
a memory to store information pertaining to an account; and
a processing device, coupled to the memory, to:
receive one or more attempts to log in from a client device into an account;
monitor activities associated with the account in view of a password expiry policy that comprises a plurality of behavior deviations that deviate from a behavior norm associated with the account, wherein the plurality of behavior deviations comprise an attempt to log in from the client device that does not have a client certificate to secure a connection from the client device to the processing device,
in response to determining that a number of occurrences of the plurality of behavior deviations exceeds a determined threshold, expire a stored password associated with the account,
receive a next login request to the account from the client device, the login request comprising an input password,
determine whether the client device has the client certificate,
in response to determining that the client device does not have the client certificate, tag the login request with a flag,
validate the input password with the stored password associated with the account,
in response to determining that the input password matches the stored password,
determine whether the stored password is an expired password,
in response to determining that the stored password is expired, cause replacing the expired stored password with a new password so that the new password becomes the stored password associated with the account,
grant access to the account, and
in response to identifying the flag being associated with the login request, expire the stored password subsequent to granting the access to the account; and
each time receiving a subsequent attempt to log in from the client device that does not have the client certificate, the processing device further to:
validate a new input password,
expire the stored password of the account subsequent to successfully validating the new input password with the stored password associated with the account, and
cause replacing the expired stored password with another new password so that the other new password becomes the stored password associated with the account.

8. The system of claim 7 wherein the processing device is to receive a login request that specifies the input password to access the account and detect the plurality of behavior deviations in view of historical behaviors associated with the account.

9. The system of claim 7, wherein the plurality of behavior deviations comprise a behavior deviation associated with a login request.

10. The system of claim 7, wherein the plurality of behavior deviations comprise using the input password to access an unauthorized system.

11. The system of claim 8, wherein the historical behaviors are in view of the historical behaviors of a set of users.

12. A non-transitory computer readable storage medium comprising instructions that, when executed by a processing device, cause the processing device to perform operations comprising:
receiving one or more attempts to log in from a client device into an account;
monitoring activities associated with the account in view of a password expiry policy that comprises a plurality of behavior deviations that deviate from a behavior norm associated with the account, wherein the plurality of behavior deviations comprise an attempt to log in from the client device that does not have a client certificate to secure a connection from the client device to the processing device;
in response to determining that a number of occurrences of the plurality of behavior deviations exceeds a determined threshold, expiring a stored password associated with the account;
receiving a next login request to the account from the client device, the login request comprising an input password;
determining whether the client device has the client certificate;
in response to determining that the client device does not have the client certificate, tagging the login request with a flag;
validating the input password with the stored password associated with the account;
in response to determining that the input password matches the stored password,
determining whether the stored password is an expired password;
in response to determining that the stored password is expired, causing replacing the expired stored password with a new password so that the new password becomes the stored password associated with the account;
granting access to the account; and
in response to identifying the flag being associated with the login request, expiring the stored password subsequent to granting the access to the account;
each time receiving a subsequent attempt to log in from the client device that does not have the client certificate, the operations further comprising:
validating a new input password;
expiring the stored password of the account subsequent to successfully validating the new input password with the stored password associated with the account; and
causing replacing the expired stored password with another new password so that the other new password becomes the stored password associated with the account.

13. The non-transitory computer readable storage medium of claim 12, wherein the operations comprise:
receiving a login request that specifies the input password of the account;
and detecting the plurality of behavior deviations associated with the account,
wherein the plurality of behavior deviations comprise a behavior deviation associated with the login request.

14. The non-transitory computer readable storage medium of claim 13, wherein the operations further comprise detecting the behavior deviations associated with the account in view of historical behaviors associated with the account, and wherein the detecting is in view of the historical behaviors of a set of users.

15. The non-transitory computer readable storage medium of claim 12, wherein the plurality of behavior deviations comprise an attempt to gain unauthorized access.

16. The non-transitory computer readable storage medium of 12, wherein the plurality of behavior deviations comprise a request sent from an unauthorized system.

17. The non-transitory computer readable storage medium of claim 13, wherein the detecting comprises:
scanning a log file to identify one or more events indicating that the password has been or is likely to be compromised.

* * * * *